UNITED STATES PATENT OFFICE.

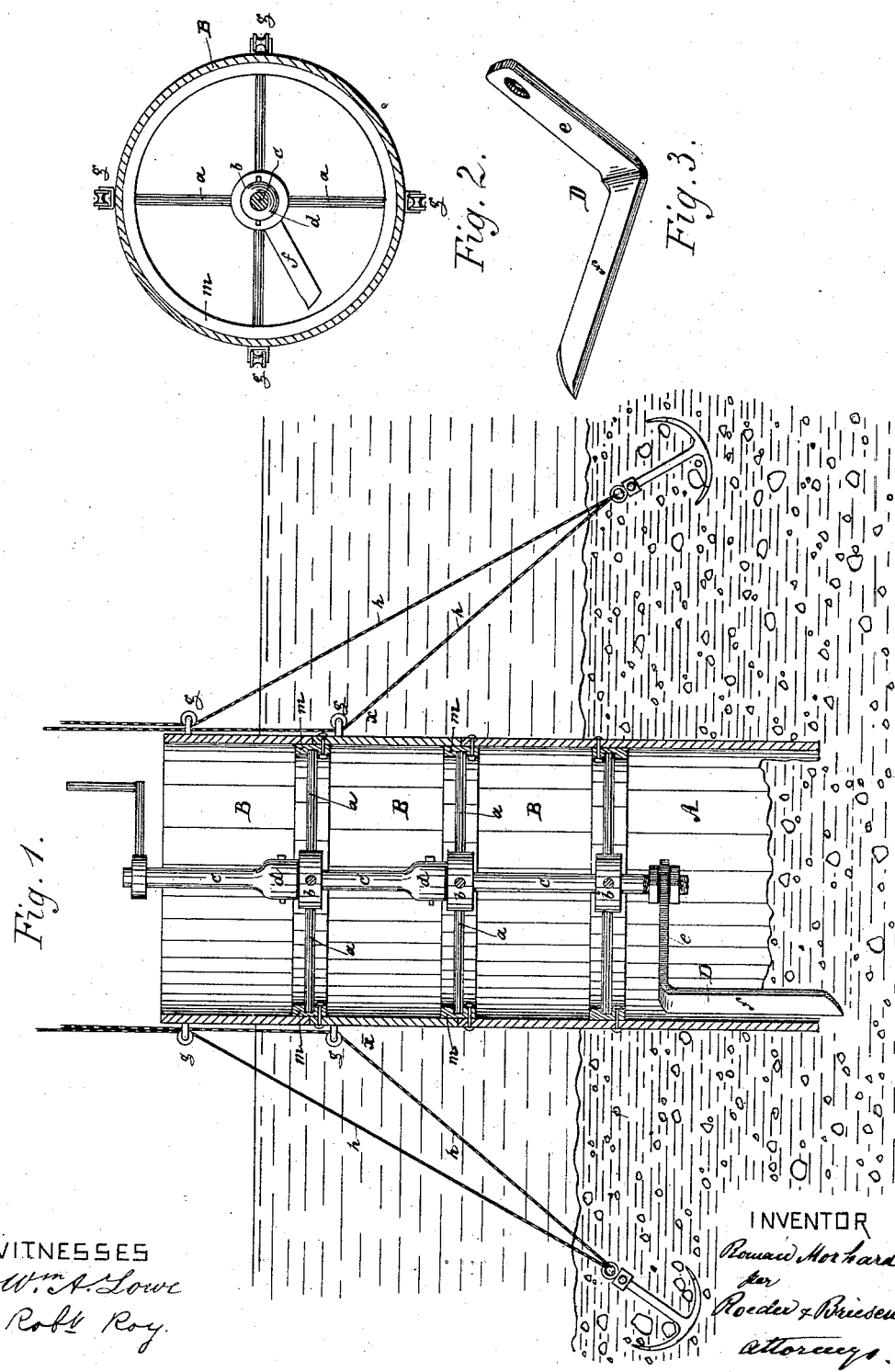

ROMAN MORHARD, OF BROOKLYN, NEW YORK.

SUBMARINE EXCAVATOR.

SPECIFICATION forming part of Letters Patent No. 317,664, dated May 12, 1885.

Application filed February 16, 1885. (No model.)

*To all whom it may concern:*

Be it known that I, ROMAN MORHARD, of the city of Brooklyn, in the county of Kings and State of New York, have invented a new and Improved Submarine Excavator, of which the following specification is a full, clear, and exact description.

This invention relates to a submarine excavator, and has for its object to properly loosen the submarine soil so as to permit the descent of the caisson. The invention consists, principally, in the combination of a caisson with a central power-shaft and a knife secured to the power-shaft in such a manner as to cut circular channels into the soil. The invention also consists in the details of construction hereinafter more fully pointed out.

In the accompanying drawings, Figure 1 is a central vertical section of my improved excavator. Fig. 2 is a horizontal section on the line $x\,x$, Fig. 1; and Fig. 3 a detail perspective view of the knife.

The letter A represents the lowermost of a series of cylindrical shells open on top and bottom, and adapted to fit on top of one another by means of slip-joints produced by an intermediate inwardly-placed ring, $m$. The upper shells, B, are in all respects similar to the lower shell, excepting that I prefer to make them somewhat shorter. The upper shells are superposed one after the other as the lower shells are sunk beneath the water-level. Each of the rings $m$ is provided with radial arms $a$, supporting a central vertically-perforated bearing, $b$. Through the bearings $b$ extends downwardly a sectional power-shaft, $c$, the sections of which are connected by suitable couplings, $d$, as shown in Fig. 1, which also act to support the shaft. As the shells are added at the top of the structure, additional lengths of power-shaft are also introduced. The uppermost section of the power-shaft is connected to a crank, and receives rotary motion from a suitable engine or other power-generator. The lowermost section of the power-shaft is connected to a knife, D. This knife is made of the form shown in Fig. 3—that is to say, it is composed of a horizontal shank, $e$, and a vertical cutting-blade, $f$. In this way the blade forms a circular channel in the soil when the power-shaft is revolved. In order to increase the width of this channel, I prefer to set the blade $f$ in such a manner that its cutting-edge projects slightly inward, or, in other words, the cutting-blade is not parallel with the circumference of shell A.

If desired, two or more cutting-blades may be attached to shank $e$ to form several channels at the same time. As the soil becomes loosened by the cutters it is removed by buckets or other means from the caisson, which of course should be practically water-tight.

Each of the shells A B is preferably provided with pulleys $g$ for receiving guy-ropes $h$ attached to anchors sunk into the river-bed.

I claim as my invention—

1. The combination of shells A B with sectional shaft $c$, and cutter D, consisting of shank $e$ and blade $f$ bent at or about right angles to the shank, substantially as specified.

2. The combination of shells A B, rings $m$ with arms $a$, and bearings $b$, shaft $c$, and knife D, substantially as specified.

3. The combination of shells A B, rings $m$ with arms $a$, and bearings $b$, shaft $c$, and knife D, having an inwardly-turned cutting-edge, substantially as and for the purpose specified.

ROMAN MORHARD.

Witnesses:
ROB ROY,
MICHAEL McHUGH.